(12) United States Patent
Sulitze

(10) Patent No.: US 9,337,646 B2
(45) Date of Patent: May 10, 2016

(54) ELECTRODE ARRANGEMENT FOR AN ELECTRICAL COMPONENT

(75) Inventor: Markus Sulitze, Falkensee (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 118 days.

(21) Appl. No.: 14/130,060

(22) PCT Filed: Jun. 21, 2012

(86) PCT No.: PCT/EP2012/061919
§ 371 (c)(1),
(2), (4) Date: Dec. 30, 2013

(87) PCT Pub. No.: WO2013/000803
PCT Pub. Date: Jan. 3, 2013

(65) Prior Publication Data
US 2014/0139966 A1  May 22, 2014

(30) Foreign Application Priority Data
Jun. 29, 2011  (DE) .......................... 10 2011 078 337

(51) Int. Cl.
| | | |
|---|---|---|
| *H02H 9/04* | (2006.01) | |
| *H02H 1/00* | (2006.01) | |
| *H02H 3/22* | (2006.01) | |
| *H01T 4/04* | (2006.01) | |
| *H01T 4/14* | (2006.01) | |
| *H01T 4/00* | (2006.01) | |

(52) U.S. Cl.
CPC .. *H02H 3/22* (2013.01); *H01T 4/00* (2013.01); *H01T 4/04* (2013.01); *H01T 4/14* (2013.01)

(58) Field of Classification Search
USPC ......................................................... 361/118
See application file for complete search history.

(56) References Cited

U.S. PATENT DOCUMENTS

| 5,852,266 A | 12/1998 | Komuro et al. | |
|---|---|---|---|
| 5,903,427 A * | 5/1999 | Roby | ............................ 361/128 |
| 6,018,453 A * | 1/2000 | Daharsh et al. | ............... 361/117 |
| 6,678,140 B2 * | 1/2004 | Jakwani et al. | ............... 361/118 |

(Continued)

FOREIGN PATENT DOCUMENTS

| AU | 2005200514 A1 | 9/2005 |
|---|---|---|
| EP | 1283575 B1 | 2/2003 |

(Continued)

*Primary Examiner* — Thienvu Tran
*Assistant Examiner* — Angela Brooks
(74) *Attorney, Agent, or Firm* — Laurence Greenberg; Werner Stemer; Ralph Locher

(57) ABSTRACT

An electrode configuration for an electrical component, in particular a surge protector, includes two electrodes extending in a plate-shaped manner parallel to a radial plane relative to a connection axis of the electrodes, defining an axial direction. At least one electrode has a connection region lying in the radial plane and at least two, three or four ribbon-shaped strips each extending away from the connection region and at least partially in circumferential direction relative to the axial direction. A fault arc, occurring during a lightning strike, can be conducted outwards away from the electrical component and forced into rotation around the electrical component in an effective manner due to the ribbon-shaped strips at the outer edge of the connection region and at least two ribbon-shaped strips overlapping each other at a spacing with respect to their delimiting surfaces lying perpendicular to the axial direction.

8 Claims, 3 Drawing Sheets

(56) References Cited

U.S. PATENT DOCUMENTS 6,678,141 B2 * 1/2004 Schmidt .................. H01T 4/14
 361/128
2003/0030957 A1 * 2/2003 Schmidt .................. H01T 4/14
 361/127

FOREIGN PATENT DOCUMENTS

| EP | 0966080 | B1 | | 2/2004 |
| EP | 1566869 | | * | 2/2004 |
| EP | 1566869 | A1 | | 8/2005 |

* cited by examiner

ELECTRODE ARRANGEMENT FOR AN ELECTRICAL COMPONENT

BACKGROUND OF THE INVENTION

Field of the Invention

The invention relates to an electrode configuration for an electrical component, having two electrodes each extending in a plate-shaped manner parallel to a radial plane with reference to a connection axis, which defines an axial direction, of the two electrodes, at least one of the electrodes having a connection region lying in the radial plane and at least two, in particular three or four, ribbon-shaped strips each running away from the connection region at least partly in the circumferential direction with reference to the axial direction.

Electrode arrangements of this type are used in electrical components, in particular in surge arresters and isolators. They are intended to protect electrical components of this type against the damaging effects of arc faults which may occur during undesired discharges caused, for example, by lightning strikes. In this connection, the electrode arrangement should conduct the arc fault as far as possible to the exterior, that is to say away from the damaged regions of the component and, at the same time, force the arc fault into a rotation about the component and thus further reduce the damaging effects of said arc fault.

Usually, a component such as this protected by the electrode arrangement has a column isolator which is connected to a high potential at one end via one electrode and to a ground potential at the other end via a second electrode. In the event of an undesired discharge, for example by means of a lightning strike, an arc often occurs between the two electrodes. The current flow of the arc current achieved owing to the configuration of the electrodes generates a magnetic field in a substantially radial direction, said magnetic field exerting a force action on the axially oriented arc perpendicular to the magnetic field, which force action causes a rotation of the arc about the axis of the component.

EP 0 966 080 B1 shows an electrode arrangement of this type in which the electrodes are circular plates which have slit-like cutouts originating from the center and leading outward EP 1 283 575 B1 describes an electrode arrangement in which at least one electrode is embodied in the form of a cup which has a flat cup base and a cup wall extending predominantly in the axial direction with material cutouts in the circumferential direction.

BRIEF SUMMARY OF THE INVENTION

Against the background of the prior art, the present invention is based on the problem of providing an electrode arrangement or an electrical component, in particular a surge arrester having a corresponding electrode arrangement, which is particularly simple in terms of construction, can be manufactured with low outlay and is particularly effective at handling voltage peaks, for example lightning.

The problem is solved by an electrode configuration for an electrical component having two electrodes each extending in a plate-shaped manner parallel to a radial plane with reference to a connection axis, which defines an axial direction, of the two electrodes, at least one of the electrodes having a connection region lying in the radial plane and at least two, in particular three or four, ribbon-shaped strips each running away from the connection region at least partly in the circumferential direction with reference to the axial direction.

According to one embodiment, the ribbon-type strips run outward in a spiral fashion in the circumferential direction from the outer edge of the connection region, and in each case at least two ribbon-type strips overlap at a distance with respect to their delimiting surfaces lying in each case perpendicular to the axial direction. According to another embodiment, at least one of the electrodes is exclusively composed of identical parts.

In this case, the invention provides an electrode arrangement having two electrodes, which each extend in a plate-like manner parallel to a radial plane with reference to the connection axis, which defines an axial direction, of the two electrodes, at least one of which electrodes has a connection region lying in the radial plane and at least two, in particular three or four, ribbon-type strips which each run away from the connection region at least in part in the circumferential direction with reference to the axial direction.

In addition, it is provided that the ribbon-type strips run outward in a spiral fashion in the circumferential direction from the outer edge of the connection region, wherein in each case at least two strips overlap at a distance with respect to their delimiting surfaces lying in each case perpendicular to the axial direction.

The spiral configuration of the ribbon-type strips firstly provides a current path which leads from the central connection region to the exterior and, as a result of the flowing current, generates a magnetic field which drives the arc drawn between the electrodes on a circular path in the circumferential direction about the connection axis. Secondly, the ribbon-type strips provide a sufficient line cross section, can be easily shaped, for example by pressing, stamping, casting or deep-drawing, and can be led in parallel in the region of their overlap in a technically simple manner. By means of the orientation of the strips with the delimiting surfaces thereof perpendicular to the axial direction, the geometric and hence the dielectric relationships between the adjacent ribbon-type strips are particularly well defined.

An advantageous configuration of the invention provides that the ribbon-type strips have, one after another in the longitudinal direction of said ribbon-type strips, an initial region bordering the connection region, a first transition region adjoining said initial region, a center region adjoining said first transition region, a second transition region adjoining said center region and an end region adjoining said second transition region, wherein the initial region, the center region and the end region have a larger radius of curvature than the first and second transition regions.

This configuration of the ribbon-type strips enables a particularly space-saving arrangement of the electrodes, seen in the axial direction, and enables the ribbon-type strips to be guided in the longitudinal direction thereof with alternating increasing and decreasing radii of curvature. As a result, it is also possible to introduce a straight region between two regions of larger curvature.

Particularly advantageously, the electrode arrangement can be configured such that the end region of a ribbon-type strip overlaps the center region of an adjacent ribbon-type strip in the axial direction.

The center region, which, in principle, has a smaller curvature, that is to say a larger radius of curvature, than the adjacent region of the strip, is a particularly preferred region for the overlap of adjacent strips. Since the drawn arc in the overlap region of the strips preferably flashes over from one strip to the other, a form which is as straight as possible or a form having as large a radius of curvature as possible in the overlap region is advantageous.

A further advantageous configuration of the invention provides that the ribbon-type strips are bent in the center region into an S-shape with an offset in the axial direction, with the result that the end regions are arranged in a plane offset parallel to the plane of the connection region.

As a result, a particularly efficient design of the individual strips is produced, with the proviso that said strips are arranged in the overlap region in each case parallel to one another and parallel to the plane of the connection region. Thus, dielectrically and electro dynamically good conditions arise firstly for driving the arc and secondly for the flashover from one ribbon-type strip to another.

Furthermore, an advantageous configuration of the invention provides that the end region of at least one ribbon-type strip, seen in the axial direction, tapers to a point by means of tapering on the radially inner side.

In the region of the respective points in the end regions of the ribbon-type strips, a particularly high field strength is established, with the result that, when the arc shifts, it flashes over to an adjacent strip at the latest in this region by means of the particular dielectric relationships. Owing to the provision of tapering in the end regions in the radially inner region, as small a disturbance as possible of the outer contour of the electrode, or a small deviation from rotational symmetry, is produced. Hence, the arc root also has the possibility of being conducted as far as possible in the radially outer region of the electrode. The invention also relates to an electrode arrangement for an electrical component, having two electrodes, which each extend in a plate-like manner parallel to a radial plane with reference to the connection axis, which defines an axial direction, of the two electrodes, at least one of which electrodes has a connection region lying in the radial plane and at least two, in particular three or four, ribbon-type strips which each lead away from the connection region, at least in part in the circumferential direction with reference to the axial direction. The construction is distinguished in that at least one of the electrodes is exclusively composed of identical parts.

With optimized dielectric and electrodynamic requirements for the conduction of an arc in the event of a surge, this configuration allows simple manufacture and assembly in terms of production, as a result of which the product is also particularly cost-effective. Stock is optimized through the use of identical parts and effects of scale in manufacturing reduce the price. The component can optionally be assembled on the plant side or on location, with the result that even the transport outlay can optionally be reduced.

In this respect, the invention may advantageously be configured such that the identical parts in the connection region are intermeshed with one another in such a way that they fix each other in an angularly rigid manner in the plane perpendicular to the axial direction.

An optimized stability of the electrode or electrodes thus results, despite the assembly of separate parts. The electrodes may optionally, if required, also be removed from one another again, as long as the identical parts are not permanently connected to one another but rather only clamped. It may advantageously be provided that the number of identical parts is equal to the number of ribbon-type strips.

Moreover, it may be advantageous for each of the identical parts to have precisely one ribbon-type strip.

The invention also relates to an electrode arrangement in which it is provided that the ribbon-type strips run outward in a spiral fashion in the circumferential direction from the outer edge of the connection region, wherein in each case at least two adjacent strips overlap at a distance with respect to their delimiting surfaces lying in each case perpendicular to the axial direction.

This constellation combines the advantages of the optimized production and logistics with the functional advantages of geometrically optimized guidance of the ribbon-type strips with the aim of the optimized conduction of an arc.

In addition to an electrode arrangement as described above, the invention also relates to a surge arrester having two electrodes which can form a corresponding electrode arrangement with all of the variants described above.

BRIEF DESCRIPTION OF THE SEVERAL VIEWS OF THE DRAWING

The invention is explained in more detail below on the basis of a drawing in which.

DESCRIPTION OF THE INVENTION

Corresponding parts are provided with the same reference signs in all of the figures.

Figure 1:
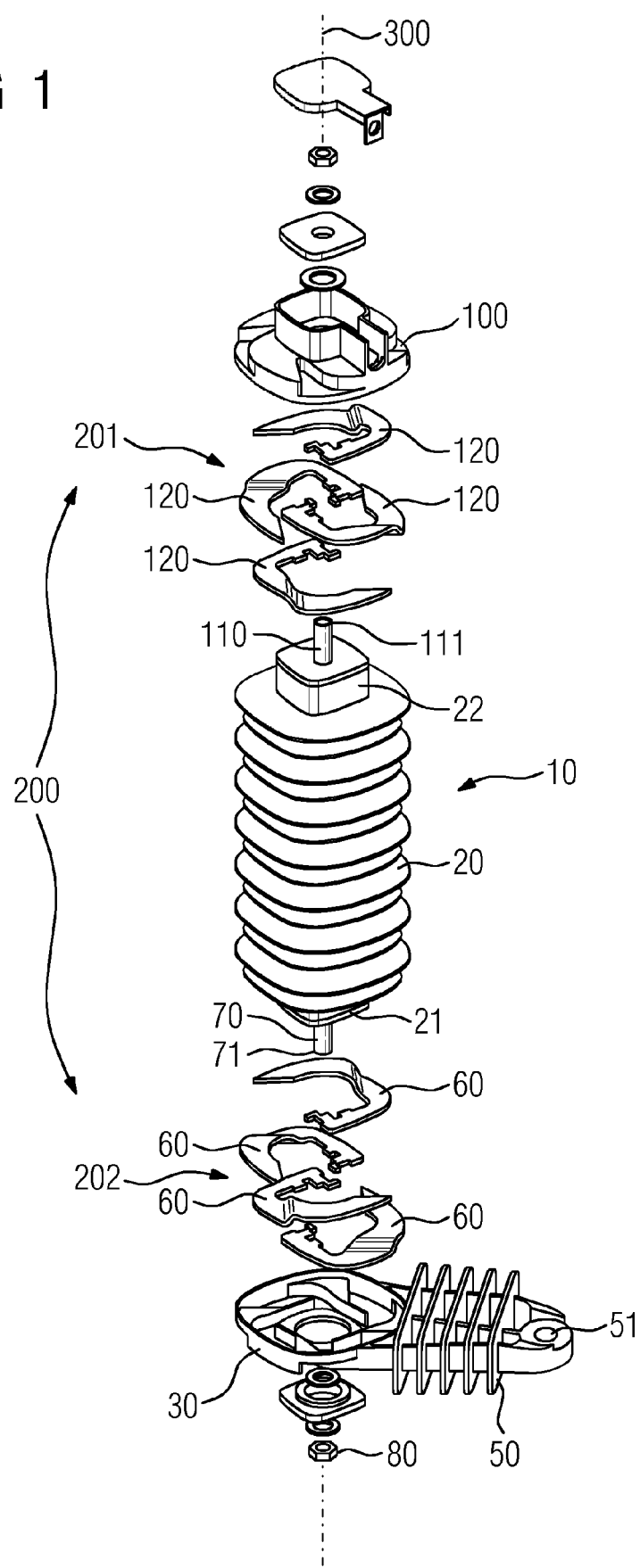
FIG. 1: shows an exploded diagram of an exemplary embodiment of a component having an electrode arrangement according to the invention.

FIG. 1 shows an electrical component, in this case a surge arrester 10, having an electrode arrangement 200. In this case, the electrode arrangement consists of an upper electrode 201 and a lower electrode 202. The surge arrester is equipped with an isolator 20. Inside the isolator 20 are one or more resistor elements—not shown in FIG. 1—which may, for example, be varistor elements. The function of the resistor element or elements is to enable a flow of current in the event of a surge and thus to enable the surge to be arrested.

A retaining element 30 is arranged in the region of the (first) isolator end 21—the lower isolator end in FIG. 1—of the isolator 20. A section of the retaining element 30 forms a fastening element 50 for the surge arrester 10 to an external support—not shown in more detail in FIG. 1. For this purpose, a fastening hole 51 is provided in the fastening element 50, through which fastening hole a fastening bolt can be fed for assembly.

A dish-shaped recess in the retaining element 30 serves to accommodate a lower electrode 202 which is composed of four identical ribbon-type strips 320. The ribbon-type strips 320 of the electrode 202 are inserted into a dish-shaped recess in the first retaining element 30 and are laterally enclosed by the side wall of the first retaining element 30. The electrode 202 is electrically connected to a lower (first) contact element 70, which is electrically connected to the lower end—not shown in FIG. 1—of the resistor element contained within the isolator 20. The lower end 71 of the lower contact element 70 extends past the electrode 202 through the first retaining element 30 and is screwed with a lower nut 80.

It can also be seen in FIG. 1 that a second retaining element 100 is arranged in the region of an upper (second) isolator end 22 of the isolator 20. An upper (second) electrode 201, which consists of four identical parts 120, is arranged inside the second retaining element 100 and is laterally enclosed by the side wall of a dish-shaped recess of the second retaining element 100.

The lower isolator end 21 and the upper isolator end 22 are separated from one another by the isolator body and the resistor elements located therein.

A second contact element 110 can also be seen in the region of the upper isolator end 22, which second contact element is electrically connected to the upper electrode 201 and the upper end 111 of which second contact element extends through the electrode 201 and the second retaining element 100.

A supply cable—not shown here—can be connected via a connection channel formed in the second retaining element 100 to the contact element 110 in order to ensure an electric connection to the exterior.

Figure 3:
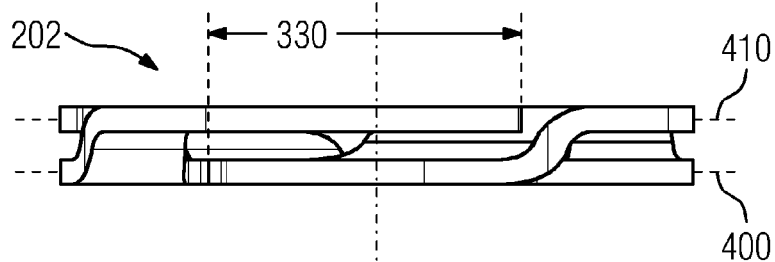
FIG. 3: shows a side view of the electrode from FIG. 2
Figure 4:
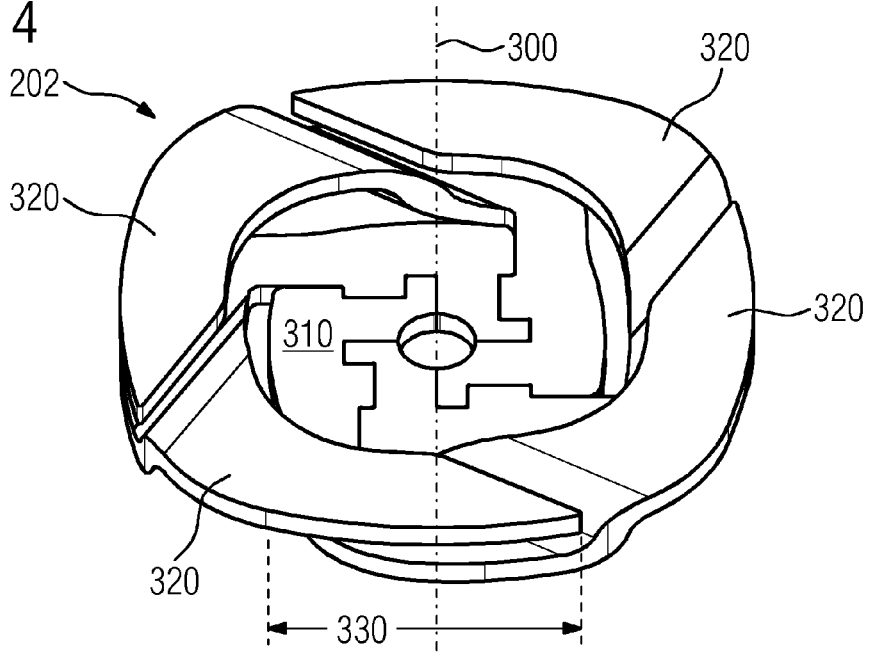
FIG. 4: shows a perspective view of the electrode from FIGS. 2 and 3, and FIG. 5: shows a perspective view of a ribbon-type strip of the electrode from FIGS. 2 to 4.

The two electrodes 201 and 202 of the electrode arrangement are mirror-symmetrical to one another with respect to a mirror plane which lies perpendicular to a connection axis 300 of the two electrodes 201, 202. At the same time, the connection axis 300 is the longitudinal axis of the surge arrester and defines an axial direction. The lower electrode 202 from the electrode arrangement 200 in FIG. 1 is shown in detail in FIGS. 2 to 4 in three different views (plan view, side view, perspective view). The electrode 202 extends in a plate-like manner in a region defined by the radial plane 400.

Figure 2:
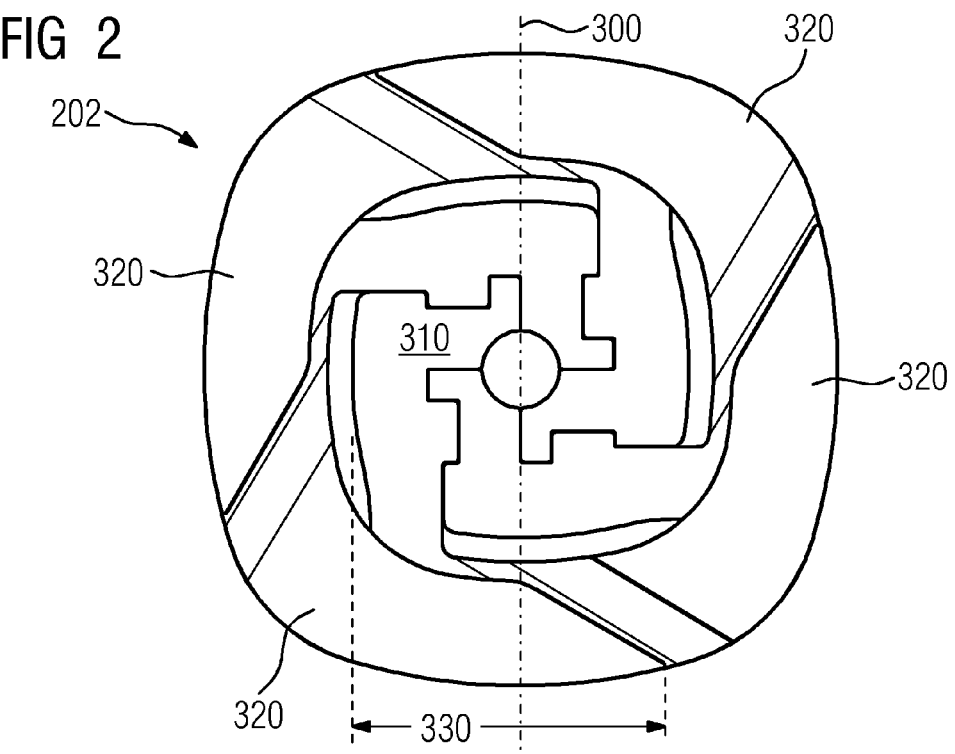
FIG. 2: shows a plan view of an electrode of an electrode arrangement according to the invention.
Figure 5:
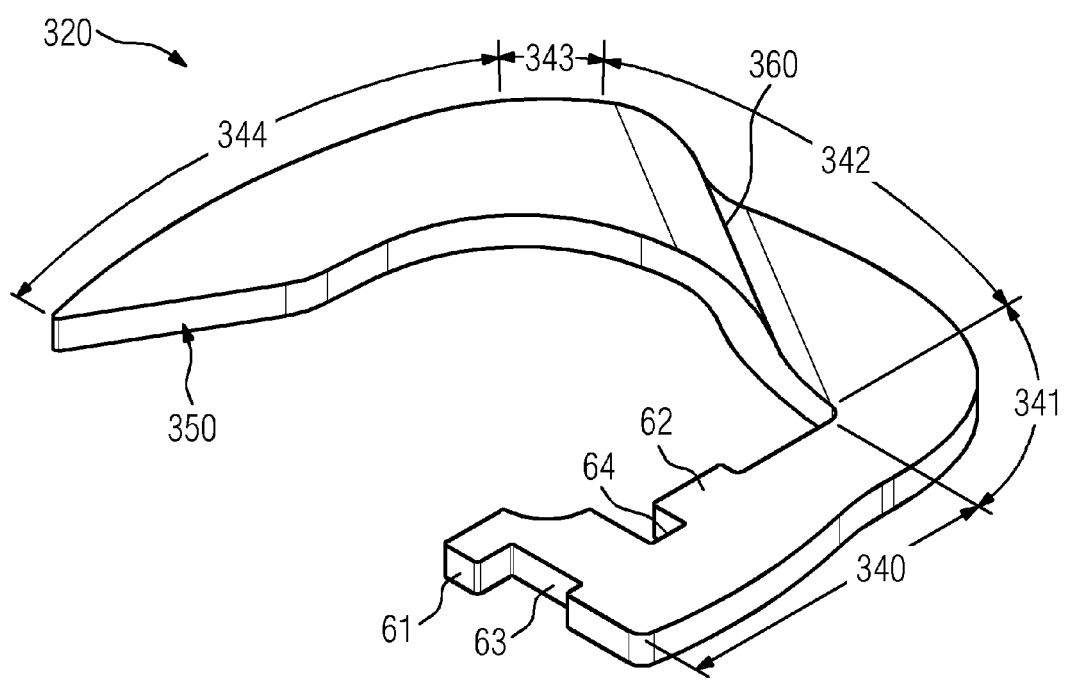

The plan view in FIG. 2 shows how the electrode 202 is composed of four identical ribbon-type strips 320. The manufacture can take place in one piece or the ribbon-type strips are produced individually and brought together to assemble the electrode 202. An individual one of said ribbon-type strips is shown in FIG. 5. Alternatively, the electrode can also be produced from another number of ribbon-type strips 320. When brought together, the initial regions 340 of the ribbon-type strips 320 form the connection region 310, lying in the radial plane 400, of the electrode 202. If the ribbon-type strips 320 are manufactured individually, they can be provided with lugs 61, 62 and cutouts 63, 64. The lugs 61 of a ribbon-type strip 320 engage in this case in cutouts 64 of an adjacent ribbon-type strip 320. Likewise, the lugs 62 engage in the cutouts 63 of an adjacent ribbon-type strip 320. The ribbon-type strips 320 are thus intermeshed with one another in the connection region 310 in such a way that they fix each other in an angularly rigid manner in a plane perpendicular to the axial direction.

Each of the ribbon-type strips 320 runs outward in a spiral fashion away from the connection region 310. In an initial region 340, the ribbon-type strip 320 at the edge of the connection region 310 runs approximately tangentially outward in the radial plane 400 of the connection region 310. Subsequently, there follows a first transition region 341, in which the ribbon-type strip is curved in the radial plane 400. The angle of curvature is approximately 90°. A center region 342 adjoins the curved first transition region 341. Said center region 342 runs almost in the circumferential direction with respect to the connection axis 300. Moreover, in the center region 342, the ribbon-type strip 320 is bent into an S-shape in the axial direction, with the result that the piece of the ribbon-type strip 320 which adjoins the S-shaped bend 360 runs in a plane 410 which is offset parallel to the radial plane 400. A second transition region 343 adjoins the center region 342, in which second transition region the ribbon-type strip again runs in a curved manner at an angle of approximately 90° in a plane 410 parallel to the radial plane 400. Finally, an end region 344 adjoins the second transition region 343, said end region being tapered on the inside, with the result that the radially outer side tapers to a point. The initial region 340, center region 342 and end region 344 each have larger radii of curvature than the first and second transition regions 341, 343.

Viewed from the inside to the outside along a ribbon-type strip 320, the initial region 340, the first transition region 341 and the piece of the center region 342 up until the S-shaped bend 360 run in the radial plane 400 and therefore in the plane of the connection region 310. The part of the center region beyond the S-shaped bend 360, the second transition region 343 and the end region 344 of the ribbon-type strip run in an offset plane 410 parallel to the radial plane 400. The orientation of the ribbon-type strips 320, with the exception of the region of the S-shaped bend 360, is such that the broad side of the ribbon-type strip 320 runs in or parallel to the radial plane 400. In other words, the surface normal of the broad side of the ribbon-type strip, with the exception of the region of the S-shaped bend 360, is perpendicular to the radial plane 400.

The delimiting surface, lying perpendicular to the axial direction, of the end region 344 of a ribbon-type strip 320 overlaps the center region 342 of an adjacent ribbon-type strip 320 in the axial direction.

The tip of the ribbon-type strip 320 ends in the axial direction approximately where the S-shaped bend starts on the ribbon-type strip below, with the result that the end region of the one ribbon-type strip 320 is spaced apart in the axial direction from the adjacent ribbon-type strip 320 and, at the same time, the tip of the ribbon-type strip 320 in the offset plane 410 is spaced apart in the circumferential direction from the adjacent ribbon-type strip 320. The tapering 350 of the end region 344 and the S-shaped bends 360 are in this case adapted to one another such that the distance of the ribbon-type strip 320 to the adjacent ribbon-type strip 320 in the offset plane 410 is approximately constant over the entire width of the ribbon-type strip 320.

Instead of the tapering 350, the end region 344 can also be continued in a further S-shaped bend 360 which is adjoined by a further second transition region 343 which is again followed by a further end region 344, with the result that three ribbon-type strips 320 overlap in places. Depending on the available space, the sequence of S-shaped bend 360, second transition region 343 and end region 344 may be repeated multiple times, with the result that, for n sequences, n+1 overlaps are produced.

If a surge occurs, for example owing to a lightning strike, which cannot be completely dissipated by the surge arrester, an arc preferably forms, owing to the field-strengthening peak effect, between a tip of one electrode 201 and a tip of the other electrode 202, which is mirror-symmetrical to the electrode 201. The arc current is forced out from the contact element 110 by the shape of the ribbon-type strips 320 to a spiral, at least in parts almost circular path. The magnetic field produced by means of said current causes the arc to rotate about the component, in this case the surge arrester. Here, the root of the arc rotates on those parts of the ribbon-type strips which lie in the offset plane 410. The flashover of the arc root from one ribbon-type strip to the next is facilitated by the shape of the end region 344 as a point and the narrow distance, which is constant over the width, between two ribbon-type strips 320 in the offset plane 410. Since the ribbon-type strips have a slight curvature in the region in which the arc root must flash over, the risk of the arc breaking down and igniting again at a different, possibly undesired, position is reduced.

The invention claimed is:

1. An electrode configuration for an electrical component, the electrode configuration comprising:
    two electrodes having a connection axis defining an axial direction, a radial plane extending radially relative to said connection axis and a circumferential direction extending circumferentially relative to said axial direction;

said electrodes each extending in a plate-shaped manner parallel to said radial plane;

at least one of said electrodes having a connection region lying in said radial plane and at least two ribbon-shaped strips each running away from said connection region at least partly in said circumferential direction;

said connection region having an outer edge;

said ribbon-shaped strips running outwardly in a spiral fashion in said circumferential direction from said outer edge of said connection region; and at least two of said ribbon-shaped strips having delimiting surfaces each lying perpendicular to said axial direction and overlapping each other at a distance.

2. The electrode configuration according to claim 1, wherein said at least two ribbon-shaped strips are three or four ribbon-shaped strips.

3. The electrode configuration according to claim 1, wherein:

said ribbon-shaped strips have a longitudinal direction;

said ribbon-shaped strips have, one after another in said longitudinal direction, an initial region bordering said connection region, a first transition region adjoining said initial region, a center region adjoining said first transition region, a second transition region adjoining said center region and an end region adjoining said second transition region; and said initial region, said center region and said end region have a larger radius of curvature than said first and second transition regions.

4. The electrode configuration according to claim 3, wherein said end region of one of said ribbon-shaped strips overlaps said center region of an adjacent one of said ribbon-shaped strips in said axial direction.

5. The electrode configuration according to claim 1, wherein:

said ribbon-shaped strips each have a length, a center region and an end region along said length; and said ribbon-shaped strips are bent in said center region into an S-shape with an offset in said axial direction, placing said end regions in a plane offset parallel to said radial plane of said connection region.

6. The electrode configuration according to claim 1, wherein said ribbon-shaped strips each have a free end region, and said free end region of at least one of said ribbon-shaped strips tapers to a point with a tapering on a radially inner side in said axial direction.

7. A surge arrester, comprising:

said electrode configuration having two electrodes according to claim 1.

8. The electrode configuration according to claim 1, wherein said delimiting surfaces of said ribbon-shaped strips are outermost surfaces of said ribbon-shaped strips.

* * * * *